United States Patent Office 3,157,608
Patented Nov. 17, 1964

3,157,608
EMULSION POLYMERIZATION
Ralph Emerson McNay, Baytown, Tex., assignor, by mesne assignments, to Ashland Oil & Refining Company, Ashland, Ky., a corporation of Kentucky
No Drawing. Filed July 13, 1960, Ser. No. 42,475
8 Claims. (Cl. 260—27)

This invention relates to synthetic rubber-like polymers, More particularly, it relates to an improved method of preparing such polymers. Still more particularly, it relates to the polymerization of a butadiene-1,3 with itself or with one or more different ethylenic compounds copolymerizable therewith in an emulsion system, and the products obtained thereby.

The excellent properties of abrasion resistance, rebound, hysteresis and high oil capacity inherent in polybutadiene have always made it a particularly attractive synthetic rubber-like polymer. Nevertheless, because of its unusually poor milling and extruding properties and its almost complete lack of tack, characteristics common to polybutadiene to varying degrees regardless of the polymerization system employed for its preparation, successful commercialization of this polymer has been considerably hindered. Efforts to improve the processability of polybutadiene by reducing its raw Mooney viscosity from the usual 30–50 to about 20, or by the addition thereto of any of various known processing aids such as pine oil, stearic acid, rosin and rosin derivatives have been effective to some extent. However, while the modified polymers thus obtained exhibit improved extrusion properties, they still have poor banding properties. Moreover, a lowering of the Mooney viscosity unfavorably influences the above described desirable inherent characteristics of polybutadiene because of an excessive decrease in its molecular weight, while the improvement effected through the use of processing aids is, at the most, only of a marginal nature.

In order to avoid the processing difficulties inherent in polybutadiene, synthetic rubber-like polymers of butadiene and styrene have been commercially employed. However, by thus gaining processing advantages, the outstanding characteristics of abrasion resistance, high oil capacity and low temperature rebound and hysteresis of polybutadiene are sacrificed to some extent. Moreover, while styrene-butadiene polymers of about a 30–70 raw Mooney viscosity are inherently tacky and process readily, higher molecular weight polymers having Mooney viscosities in the range of 70–140 also suffer from processing difficulties. In addition, in the copolymerization of styrene and butadiene at high conversion levels or when high molecular weight products are being prepared, there is a tendency, as there is under similar conditions in the polymerization of butadiene, for gel to form. Such gel not only interferes with processing but causes polymer quality deterioration as well.

There has continued to remain, therefore, a demand for polybutadiene, as well as for high Mooney viscosity styrene-butadiene copolymers, having improved processing characteristics. It is a principal object of this invention to fulfill this demand. It is a further object of this invention to provide polybutadiene and high Mooney styrene-butadiene polymers by an improved emulsion polymerization method. A further object is to provide polybutadiene of improved processing characteristics without sacrificing its other properties of inherent utility. A still further object of this invention is to provide an improved emulsion polymerization method in which the formation of quality deteriorating insoluble gel is minimized. Another object is to provide synthetic polymers having improved aging properties. It is also an object of this invention to minimize the increase in viscosity during Banbury mixing of high Mooney viscosity oil-extended polybutadiene and styrene-butadiene polymers.

In accordance with this invention, these objects have been met in a surprisingly effective manner. In general, the improved method of this invention comprises conducting a conventional emulsion polymerization of butadiene, with itself or with at least one different ethylenic compound polymerizable therewith, in the presence of an effective amount of a polymerization additive derived from the plant Grindelia. More particularly, the method comprises conducting the polymerization in the presence of a polymerization additive which is a water soluble salt of an extract of the plant Grindelia, the extract being soluble in both alcohol and hydrocarbon solvents. Once the polymerization reaction has proceeded to the desired degree of conversion, the reaction is shortstopped and the resultant latex further treated in conventional manner to produce a synthetic rubber having exceptional processing properties among others.

The plant Grindelia from which the polymerization additive of this invention is derived belongs to the tribe Asteroideae of the natural family Compositae. The genus Grindelia includes some 25 species, six or eight of which are found in South America. The remainder occur in the United States mostly west of the Mississippi River, generally in arid and semi-arid plateau regions, although certain species also appear in regions where rain-fall is more plentiful. A particularly prevalent plant in the United States is the species *G. squarrosa*, commonly referred to as "curly cup gumweed." Other well known species are *G. humilis*, "marsh gumweed," *G. camporum*, "field gumweed," *G. robusta*, *G. nana*, *G. fastigiata*, *G. perennis* and *G. blakei*, among others. The varied species are perennial or biennial and produce, in varying amounts depending on the specie, a sticky resinous substance on the stem and leaves and especially on the flower heads. From this characteristic is derived the common name "gum plant" or "gum weed." Extracts of the plant have been shown to exhibit some utility in certain areas of the pharmaceutical field, but beyond this there has apparently been no further investigation of the plant for any purpose.

The polymerization additive employed according to the present invention is obtained from the plant Grindelia by conventional extraction means. Thus, the finely pulverized plant including leaves, flower heads and stems is simply leached by percolating therethrough any common hydrocarbon solvent such as VM & P naphtha. The extract is a soft, light amber colored, resinous substance which is substantially soluble in alcohol. This resinous substance, according to the present method, is incorporated as a water soluble salt in the emulsion system. However, the substance contains approximately 10% of an alcohol insoluble material which, if separated and discarded by subjecting it to further extraction, renders the residual material an even superior polymerization additive. It is a preferred embodiment of this invention, therefore, to employ as a polymerization additive, in the form of a water soluble salt, a hydrocarbon solvent extract of the plant Grindelia which has been purified by further extraction with alcohol.

By water soluble salts, as used herein, is meant principally the alkali metal salts, particularly the sodium and potassium salts, including the ammonium salt. The salts of the resinous substance are readily prepared in a conventional manner by adding an aqueous solution of the preferred hydroxide of any convenient concentration to an aqueous dispersion of the resinous substance. The resultant mixture is agitated at room temperature until solution is complete. When incorporated in an emulsion polymerization system according to the method herein, the aqueous salt solution may be used in varied concentrations but will generally be employed as about a 10–25% aqueous solution.

The following example illustrates the extraction of the plant Grindelia and the saponification of the extract. All parts are by weight unless otherwise noted.

EXAMPLE 1

1000 parts of the whole plant *G. squarrosa* is pulverized with a hammer mill and subjected to extraction by simple percolation at room temperature with 2000 parts of commercially available VM & P naphtha. After 30 minutes, the resultant slurry is filtered and the filtrate subjected to distillation to remove the solvent, leaving 120 parts of a resinous substance. 100 parts of the resin are dissolved in 900 parts of methyl alcohol and the resultant slurry filtered to separate the alcohol insoluble fraction. On distillation to remove the alcohol, 92 parts of purified resinous substance are obtained. 50 parts of the purified resinous substance are suspended in 200 parts of water, neutralized to a pH of 10–11 with 10% sodium hydroxide and agitated at room temperature for 10 minutes. Additional water is then added to give a 15% solution.

The amount of polymerization additive employed in accordance with this invention may be quite widely varied. It has been found, for instance, that improved processability is imparted to polybutadiene and high Mooney viscosity styrenebutadiene copolymers when polymerization is conducted in an emulsion system containing as little as about 0.5% by weight of the saponified resin based on the weight of the monomer content. This amount may be considerably increased to as much as about 10%, but the use of the additive in amounts much beyond 10% is not recommended since such larger amounts tend to have a deleterious effect on the reaction. The usual practice, therefore, will be to employ about 3.0–6.0% by weight of the monomer content in which range readily processable rubbers having excellent physical properties are obtained. Although the polymerization additive may be incorporated in the emulsion system at varying stages of the polymerization reaction, the most outstanding polymer improvement is obtained if it is present during substantially the entire reaction. The advantages of this invention are not obtained to any measurable degree if the additive is incorporated at any time after the reaction has progressed to any substantial extent. The preferred mode of operation, accordingly, is to have the additive present in the emulsion system from the start of the reaction.

As previously indicated, the present invention is particularly directed to the preparation of improved rubber-like polybutadiene polymers. When practiced on the polymerization of butadiene in an emulsion system, a product is obtained by this invention which has vastly superior processing properties. Not only does it extrude well but its excellent banding to the roll during milling is quite unexpected when viewed in the light of previous experiences. In addition to its unusual processing properties, however, the polymer has excellent surface tack and exhibits superior physical properties as compared to a product prepared in the absence of the polymerization additive of this invention. Similar improved processing properties are also exhibited by high Mooney viscosity styrenebutadiene copolymers when prepared according to this invention.

An additional surprising feature of the present invention is the decrease in gel formation, particularly when the polymerization reaction is run to a high conversion or a high molecular weight polymer is formed. This insoluble gel fraction caused by cross linking and the like has been shown to have an undesirable effect on processability as well as on polymer quality. The practice of the present invention, moreover, minimizes the tendency of high Mooney viscosity oil-extended polybutadiene and styrene-butadiene polymers to continuously increase in viscosity during Banbury mixing, a characteristic which is highly undesirable in commercial practice. As is well known, tack and processability are not problems with styrenebutadiene polymers of about 30–70 Mooney and of polymers of other ethylenic compounds with butadiene. Nevertheless, the present invention exhibits improvements in certain properties of these polymers also. Thus, it has been shown that these polymers, when produced according to the method of this invention, are characterized by better black dispersion and sheet out properties and particularly by improved resistance to deterioration by oxygen.

Although principally directed to polybutadiene and certain styrene-butadiene polymers, any one or more of the advantages of the present invention as above described may be realized in other polymers prepared by the emulsion polymerization of a polymerizable ethylenic compound either with itself or with one or more different polymerizable ethylenic compounds. By ethylenic compounds is meant, for example, conjugated diolefins such as butadiene-1,3, methyl-2-butadiene-1,3, chloro-2-butadiene-1,3, piperylene, 2,3-dimethyl butadiene-1,3, butadiene-1,3 and the like, aryl olefines such as styrene, vinyl naphthlene, $\alpha$-methylstyrene, p-chlorostyrene, vinyl toluene, divinyl benzene and the like; $\alpha$-methylene carboxylic acids, their esters, nitriles and amides such as acrylic acid, methyle acrylate, methylmethacrylate, acrylonitrile, methacrylonitrile, acrylamide, methacrylamide and the like; vinyl aliphatic compounds such as the vinyl halides, vinyl acetate, methyl vinyl ether, methyl vinyl ketone and the like; and vinylidene compounds such as the vinylidene halides.

The method of the present invention may be practiced in the preparation of "white rubber" as well as in the preparation of black and oil-extended masterbatches. The particular types of oils and blacks employed in masterbatching form no part of this invention. Suffice it to say that it foils and blacks are employed, they may be those normally employed in the art for this purpose.

The following examples further illustrate the invention. All parts are by weight unless otherwise noted.

EXAMPLE 2

A polybutadiene is prepared by conventional polymerization techniques in an aqueous emulsion system at 41° F. using the following recipe.

| Component: | Parts by weight |
| --- | --- |
| Butadiene | 100.0 |
| Sodium fatty acid soap | 2.14 |
| Potassium salt of disproportionated rosin | 2.25 |
| Tripotassium phosphate | 0.40 |
| Sodium alkyl naphthalene sulfonate | 0.15 |
| Paramenthane hydroperoxide | 0.09 |
| NaOH | 0.015 |
| Tert-dodecyl mercaptan | 0.45 |
| Potassium pyrophosphate | 0.253 |
| $FeSO_4 \cdot 7H_2O$ | 0.20 |
| Water | 200.0 |

The reaction is shortstopped at 60% conversion in 8.25 hours using 0.10 part of sodium dimethyl dithiocarbamate and 0.05 part of mixed amines and a portion thereof coagulated by conventional means. The dried unpigmented polymer has a Mooney viscosity at 212° F. (ML–4) of 33, has substantially no elasticity and is entirely devoid of surface tack. The remaining latex is coagulated as a masterbatch with 50 parts of HAF black and 1.5 parts of phenyl-$\beta$-naphthylamine as an antioxidant per 100 parts of polymer. The resultant masterbatch is then compounded on a mill according to the following recipe.

Component: Parts
 Masterbatch _____ 150
 Zinc oxide _____ 6
 Sulfur _____ 8
 MBTS _____ 6

The masterbatch is extremely difficult to process. It does not band on the mill roll and it is very slow in accepting the compounding ingredients. Processing oils added on the mill fail to materially improve processing characteristics. The milled product is stiff, entirely devoid of tack and has a dull and rough surface. A sample of the compounded stock when extruded through a Garvey die is extremely rough at both the front and back edges and has a very rough and dull surface.

EXAMPLE 3

The procedure of Example 2 is repeated except that the recipe includes as a polymerization additive 1.0 part by weight of the sodium salt of Example 1 added in the form of a 25% aqueous solution. The resultant dried, unpigmented polymer obtained on coagulation of a portion of the latex has a Mooney viscosity at 212° F. (ML–4) of 33. It exhibits exceptional elasticity and tensile properties and has excellent surface tack. On masterbatching of the remainder of the latex and compounding as in Example 2, the processing characteristics of the product are vastly superior to those exhibited by the product of Example 2. It bands on the roll readily and the compounded stock has excellent surface tack. A sample of the stock when extruded through a Garvey die is smooth and glossy. The back edges are smooth and sharp and the front edges are only slightly broken.

EXAMPLE 4

The procedure of Example 3 is repeated using 4.0 parts by weight of the product of Example 1 as a 25% aqueous solution. The reaction is shortstopped at 60% conversion after 9.75 hours. Results even superior to those of Example 3 are obtained. In all respects, the resultant masterbatch is the equivalent in processability to a standard GR–S 1502 masterbatch.

EXAMPLE 5

Samples of the products of Examples 2 and 4 are subjected in the Geer Oven Test for 48 hours at 212° F. and the tensile strengths measured. For purposes at comparison, the before and after treatment tensile strengths, as well as the precent of original strength retained, are shown in the following table.

*Table I*

| Example | Original Tensile Strength, p.s.i. | Final Tensile Strength, p.s.i. | Percent Original Tensile Retained |
|---|---|---|---|
| 2 | 2,890 | 1,460 | 50 |
| 4 | 2,770 | 2,050 | 74 |

The above data illustrate the improved resistance to oxidation exhibited by the product prepared according to this invention.

EXAMPLE 6

The procedure of Example 4 is repeated using as polymerization additives the potassium and ammonium salts of the extract of Example 1 prepared in a similar manner and employed as 25% aqueous solutions. Similar excellent improvements in processability and tack are observed in each instance.

EXAMPLE 7

The procedures of Example 4 is repeated using as polymerization additives the sodium salts of the resinous derivatives of *G. camporum* and *G. robusta* extracted and saponified as in Example 1. Similar results are obtained.

EXAMPLE 8

The procedure of Example 2 is repeated except that polymerization is conducted at 65° F. The reaction is shortstopped at 60% conversion after 3.5 hours. A masterbatch prepared from the resultant polymer has somewhat better processing properties than one containing a polymer prepared at 41° F., but it is still difficult to mill and has poor surface tack.

EXAMPLE 9

The procedure of Example 8 is repeated with the exception that 6 parts of the sodium salt of the resinous extract of *G. squarrosa* as a 25% aqueous solution prepared as in Example 1 is incorporated in the emulsion system. The resultant masterbatch obtained as in Example 8 exhibits vastly improved processing properties when compounded on the mill and excellent surface tack as compared to the product of Example 8.

EXAMPLE 10

A polybutadiene is prepared by emulsion polymerization at 41° F. as in Example 2 using the following recipe.

Component: Parts by weight
 Butadiene _____ 100.0
 Sodium fatty acid soap _____ 2.14
 Potassium salt of disproportionated rosin ___ 2.25
 Sodium alkyl naphthalene sulfonate _____ 0.15
 Product of Example 1 as a 25% aqueous solution _____ 4.0
 Paramenthane hydroperoxide _____ 0.05
 NaOH _____ 0.015
 Tert-dodecyl mercaptan _____ 0.45
 Sodium formaldehyde sulfoxylate _____ 0.08
 Sodium salt of ethylene diamine tetraacetic acid _____ 0.04
 Tripotassium phosphate _____ 0.04
 $FeSO_4 \cdot 7H_2O$ _____ 0.015
 Water _____ 200.0

The reaction is shortstopped at 60% conversion in 9.75 hours using 0.10 part of sodium dimethyl dithiocarbamate and 0.05 part of mixed amines. On coagulation of a portion of the latex, the resultant polymer has a Mooney viscosity at 212° F. (ML–4) of 31. The dried, raw, unpigmented polymer has very unusual elasticity and tensile properties and appreciable surface tack as compared to a polymer prepared in the absence of the polymerization additive of this invention. When the remaining latex is masterbatched as in Example 2 and compounded on the mill, similar improved processing and extrusion properties are exhibited.

EXAMPLE 11

A polybutadiene polymer is prepared by emulsion polymerization at 41° F. using the following recipe.

Component: Parts by weight
 Butadiene _____ 100.0
 Sodium fatty acid soap _____ 2.14
 Potassium salt of disproportionated rosin ___ 2.25
 Tripotassium phosphate _____ 0.40
 Sodium alkyl naphthalene sulfonate _____ 0.15
 Paramenthane hydroperoxide _____ 0.09
 NaOH _____ 0.015
 Tert-dodecyl mercaptan _____ 0.10
 Potassium pyrophosphate _____ 0.253
 $FeSO_4 \cdot 7H_2O$ _____ 0.20
 Water _____ 200.0

The reaction is shortstopped at 60% conversion after 7.5 hours using 0.10 part sodium dimethyl dithiocarbamate and 0.05 part of mixed amines. On coagulating a portion of the latex, the resultant polymer has a Mooney viscosity at 212° F. (ML-4) of 125. It has almost no elasticity and is entirely devoid of tack. The remaining latex is coagulated as a masterbatch with 75 parts of a highly aromatic extender oil and 75 parts of HAF black per 100 parts of polymer, 1.5 parts of phenyl-$\beta$-naphthylamine being added as an antioxidant. The masterbatch is very difficult to process on a mill and extrudes with difficulty.

EXAMPLE 12

The procedure of Example 11 is repeated incorporating in the emulsion system 4 parts of the sodium salt of the resinous extract of Example 1 as a 25% aqueous solution. The resultant polymer obtained from a portion of the latex has unusual elasticity and excellent tack. When the remaining latex is masterbatched as in Example 11, it is found to process without difficulty on the mill. On extrusion, a smooth and uniform product is obtained.

EXAMPLE 13

A butadiene/styrene copolymer is prepared by emulsion polymerization at 41° F. using the following recipe.

| Component: | Parts by weight |
|---|---|
| Butadiene | 95.0 |
| Styrene | 5.0 |
| Sodium fatty acid soap | 2.14 |
| Potassium salt of disproportionated rosin | 2.25 |
| Tripotassium phosphate | 0.40 |
| Sodium alkyl naphthalene sulfonate | 0.15 |
| Product of Example 1 as a 25% aqueous solution | 4.0 |
| Paramenthane hydroperoxide | 0.09 |
| NaOH | 0.015 |
| Tert-dodecyl mercaptan | 0.45 |
| Potassium pyrophosphate | 0.253 |
| $FeSO_4 \cdot 7H_2O$ | 0.20 |
| Water | 200.0 |

The reaction reaches 60% conversion in 15.7 hours and is shortstopped with 0.10 part sodium dimethyl dithiocarbamate and 0.05 part of mixed amines and a portion thereof coagulated by conventional means. The dried unpigmented polymer has a Mooney viscosity at 212° F. (ML-4) of 33 and exhibits very unusal elasticity, tensile, and tack properties. On coagulation of the remainder of the latex as a masterbatch with 50 parts of HAF black and 1.5 parts of phenyl-$\beta$-naphthylamine per 100 parts of polymer and compounding on a mill as in Example 2, it is found that the processability is excellent, being equal in all respects to a standard GR-S masterbatch of comparable Mooney viscosity. This is in contrast to the extremely poor processing properties of a masterbatch prepared as above but without the benefit of the polymerization additive of this invention.

EXAMPLE 14

Two batches of butadiene/styrene copolymer are prepared by emulsion polymerization at 41° F. in accordance with the following recipe except that one batch is prepared using 4 parts of the polymerization additive of Example 1.

| Component: | Parts by weight |
|---|---|
| Butadiene | 72.0 |
| Styrene | 28.0 |
| Sodium fatty acid soap | 2.14 |
| Potassium salt of disproportionated rosin | 2.25 |
| Tripotassium phosphate | 0.40 |
| Sodium alkyl naphthalene sulfonate | 0.15 |
| Paramenthane hydroperoxide | 0.09 |
| NaOH | 0.015 |
| Tert-dodecyl mercaptan | 0.06 |
| Potassium pyrophosphate | 0.253 |
| $FeSO_4 \cdot 7H_2O$ | 0.20 |
| Water | 200.0 |

When the reactions reach 60% conversion, a sample is taken and gel and Mooney viscosity determinations made. Additional samples are taken and tested at approximately 70% and 85% conversion. The results appear in Table II in which Samples 1–3 represent the copolymer prepared without the polymerization additive of this invention while Samples 4–6 represent the copolymer prepared according to this invention.

Table II

|  | Percent Conversion ||||||
|---|---|---|---|---|---|---|
|  | 60 | 70 | 85 | 60 | 70 | 85 |
| Sample No | I | II | III | IV | V | VI |
| Polymerization Additive | 0 | 0 | 0 | 4 | 4 | 4 |
| Percent insoluble gel | 28.3 | 68.7 | 63.7 | 1.0 | 0.6 | 8.1 |
| Mooney Viscosity (ML-4 @ 212° F.) | 115 | 128 | 145 | 135 | 138 | 142 |

The above data illustrate the low insoluble gel content obtained when practicing the polymerization procedure according to the method of this invention.

EXAMPLE 15

Two batches of styrene/butadiene are prepared as in Example 14. Each reaction is shortstopped at 60% conversion and a portion of the latex coagulated. The dried unpigmented polymers have Mooney viscosities of 145 at 212° F. (ML-4). The remaining portion of each latex is masterbatched with 50 parts of a highly aromatic oil and 1.5 parts of phenyl-$\beta$-naphthylamine per 100 parts of polymer, coagulated and dried. The dried polymers are then put through a mill at a 0.035 inch setting 12 minutes at 212° F. Results appear in Table III.

Table III

| | Polymerization Additive | Time (Min.) |||||| Mooney Increase (Percent) |
|---|---|---|---|---|---|---|---|---|
| | | 1 | 2 | 4 | 6 | 8 | 10 | 12 | |
| Mooney Viscosity | 0 | 49 | 52 | 58 | 60 | 61 | 62 | 63 | 29 |
| | 4 | 52 | 51 | 52 | 53 | 53 | 53 | 52 | 0 |

The above data illustrate how the tendency of oil-extended high Mooney viscosity polymers to increase in viscosity during Banbury mixing is minimized by polymerizing according to the process of this invention.

When the present method is practiced on the emulsion polymerization of butadiene-styrene to produce low Mooney viscosity polymers and on other emulsion systems to produce polymers, such as butadiene-acrylonitrile and the like, the advantages of this invention such as resistance to deterioration by oxygen, improved sheeting out, decreased gel formation and the like are obtained. Processing properties for such polymers are not measurably improved since they are already excellent and, as a practical matter, require no particular improvement. The following examples illustrate the method of the present invention when practiced on the emulsion polymerization of butadiene-acrylonitrile.

EXAMPLE 16

A butadiene/acrylonitrile copolymer is prepared by emulsion at 80° F. using the following recipe.

| Component: | Parts by weight |
|---|---|
| Butadiene | 75 |
| Acrylonitrile | 25 |
| Sodium alkyl naphthalene sulfonate | 3.6 |
| Tert-dodecyl mercaptan | 0.5 |
| Tripotassium phosphate | 0.3 |
| NaOH | 0.02 |
| Water | 200.0 |

Reaction time is four hours and conversion 85%. The polymer is then coagulated as a masterbatch comprising 50% HAF black, 20 parts of highly aromatic oil and 1.5 parts of phenyl-β-naphthyl amine per 100 parts of polymer and recovered in a conventional manner. Gel content is determined at 40%.

EXAMPLE 17

The procedure of Example 16 is repeated except that polymerization is conducted in the presence of 4 parts of the sodium salt of the resinous extract of Example 1 as a 25% aqueous solution. Gel content is only 0.8% at the same conversion level as in Example 16. The products of Example 16 and this example are compounded according to the following recipe.

| Component: | Parts by weight |
|---|---|
| Masterbatch | 150 |
| Sulfur | 8 |
| Zinc oxide | 6 |
| Accelerator | 6 |

After curing for 50 minutes, the products are tested for tensile properties. Results appear in Table IV.

*Table IV*

| Example No | Modulus at 300% (p.s.i.) | Tensile at break (p.s.i.) | Elongation at break (percent) |
|---|---|---|---|
| 16 | 1,970 | 2,070 | 300 |
| 17 | 1,650 | 3,400 | 490 |

I claim:

1. A method of preparing a synthetic rubber polymer by the emulsion polymerization of a member selected from the group consisting of a butadiene-1,3 and a butadiene-1,3 with at least one different ethylenic compound copolymerizable therewith, which comprises: conducting the emulsion polymerization in contact with a hydrocarbon soluble extract of the plant Grindelia obtained by extracting said plant with a hydrocarbon, said extract being in the form of a salt selected from the group consisting of the alkali metal and ammonium salt, and recovering the polymer thus formed.

2. A method of preparing a synthetic rubber polymer by the emulsion polymerization of a member selected from the group consisting of butadiene-1,3 and butadiene-1,3 with styrene, which comprises: conducting the emulsion polymerization in contact with about 0.5-10% by weight of the monomer content of a hydrocarbon soluble-alcohol soluble extract of the plant Grindelia obtained by extracting said plant with a hydrocarbon and then extracting the resulting hydrocarbon soluble extract with an alcohol, said hydrocarbon soluble-alcohol soluble extract being in the form of a salt selected from the group consisting of the alkali metal and ammonium salts, and recovering the polymer thus formed.

3. A method according to claim 2 in which the amount of hydrocarbon soluble-alcohol soluble extract is about 3.0-6.0% by weight of the monomer content.

4. A method according to claim 2 in which the extract is from the plant *Grindelia squarrosa*.

5. A method according to claim 2 in which the member is butadiene.

6. A method according to claim 2 in which the member is butadiene with styrene.

7. A synthetic rubber polymer prepared according to the method of claim 1.

8. A synthetic rubber polymer prepared according to the method of claim 2.

References Cited by the Examiner

UNITED STATES PATENTS

| 2,384,910 | 9/45 | Hanson et al. | 260—27 |
| 2,512,697 | 6/50 | Te Gratenhuis | 260—8 |
| 2,550,258 | 4/51 | Jensen | 99—150 |
| 2,556,575 | 6/51 | Cubberly et al. | 260—8 |
| 2,822,341 | 2/58 | Miller et al. | 260—23 |
| 2,868,741 | 1/59 | Chambers | 260—8 |
| 2,956,973 | 10/60 | Holdsworth | 260—8 |

LEON J. BERCOVITZ, *Primary Examiner.*

A. D. SULLIVAN, MILTON STERMAN, *Examiners.*

UNITED STATES PATENT OFFICE
CERTIFICATE OF CORRECTION

Patent No. 3,157,608                          November 17, 1964

Ralph Emerson McNay

It is hereby certified that error appears in the above numbered patent requiring correction and that the said Letters Patent should read as corrected below.

Column 4, line 30, for "olefines" read -- olefins --; line 34, for "methyle" read -- methyl --; column 5, line 50, for "at" read -- of --; column 8, line 33, strike out "bers are then put through a mill at a 0.035 inch setting"; line 34, after "setting" insert -- after which they are run in a Mooney viscometer for --; column 9, Table IV, heading to the first column, for "Example No1" read -- Example No. --; column 10, line 1, for "salt" read -- salts --.

Signed and sealed this 10th day of May 1966.

(SEAL)
Attest:

ERNEST W. SWIDER                                    EDWARD J. BRENNER
Attesting Officer                                         Commissioner of Patents